United States Patent Office 2,804,471
Patented Aug. 27, 1957

2,804,471

MANUFACTURE OF CYANOFORMAMIDE

Richard Parke Welcher, Old Greenwich, Conn., assignor to American Cyanamid Company, New York, N. Y., a corporation of Maine No Drawing. Application January 27, 1956,
Serial No. 561,927

9 Claims. (Cl. 260—465.4)

This invention relates to a new and novel improved process for the preparation of a hydration product of cyanogen. More particularly, it relates to an improved method for preparing cyanoformamide ($CNCONH_2$).

Cyanoformamide is a known compound. It is normally a crystalline solid, soluble in common solvents as, for instance, water and alcohol. The compound possesses good nematocide and rodenticide properties. In the molten state, it is a good solvent for polyacrylonitrile.

Although cyanoformamide possesses interesting properties for commercial exploitation, it has nevertheless remained a laboratory curiosity because its synthesis was commercially impractical. For instance, it has been prepared by mixing cyanogen with glacial acetic acid in the presence of about 0.5% water, and then heating the contents in a sealed tube. Reaction took several months. Care had to be exercised to avoid the presence of water above the stated amount for otherwise oxamide rather than cyanoformamide was obtained. This process is not considered commercially feasible.

An object of the present invention, therefore, is to devise an improved process for reacting cyanogen to obtain cyanoformamide quickly and without oxamide formation.

According to the present invention, cyanoformamide is obtained by admixing cyanogen with water in the presence of catalytic amounts of an acidic, water soluble oxygenated phosphorus compound in a closed vessel and heating the contents for not more than several days at a temperature of from about 50° C. to 90° C. to produce cyanoformamide. It has been found that where one or more equivalents of water is reacted with one equivalent of cyanogen, good yields of cyanoformamide are obtained. Although hydration of cyanogen will occur in the manner described, it will proceed more smoothly in the presence of an inert polar solvent for cyanogen. For instance, a solvent such as water, formic acid, acetic acid, acetonitrile, tetrahydrofuran and mixtures thereof is advantageously employed as the solvent medium.

The presence of water is of course of prime importance because, although one equivalent of water for each equivalent of cyanogen is theoretically required to prepare cyanoformamide, it has been found that the presence of an excess of water over that which is theoretically required for reaction is not only beneficial as providing a liquid menstruum during reaction but is highly advantageous to obtain excellent yields of cyanoformamide product in the absence of oxamide. For example, from about 2 to 16 equivalents of water per equivalent of cyanogen can be employed, although larger quantities of water are not deleterious for reaction. Surprisingly little or no oxamide is found, although cyanogen can be hydrated to oxamide in the presence of water under other conditions.

It has been found that, in general, any acidic, water soluble oxygenated phosphorus compound can be used in the process of the invention. Typically illustrative of such compounds which are very satisfactory include: phosphoric acid, methanephosphonic acid, diethylphosphoric acid, benzenephosphonic acid, sodium dihydrogen phosphate, and the like. The amount of catalyst required in the reaction will depend upon its activity in promoting the conversion of cyanogen to cyanoformamide. In general, it has been found that from 0.01 to 0.5 equivalent of oxygenated phosphorus compound will satisfactorily assist in the conversion of cyanogen to cyanoformamide.

In order to facilitate a further understanding of the invention, the following examples are given primarily for the purpose of illustrating certain more specific details thereof. The scope of the invention is not to be deemed limited thereby except as defined in the claims. Unless otherwise noted, the parts given are by weight.

*Example 1*

A mixture containing 18 parts cyanogen, 21.6 parts water, 2.9 parts phosphoric acid and 60 parts of acetonitrile is fed into an autoclave and heated for 15 hours at 74° C. Heating is then terminated and the contents are removed from the vessel. They are neutralized with sodium formate and evaporated to dryness. Cyanoformamide is extracted from the residue with ether to obtain a 29% yield of a water soluble and alcohol soluble crystalline residue, melting at 60° C.–62° C. No oxamide is found.

*Example 2*

Into an autoclave is fed a mixture containing 15 parts of cyanogen, 30 parts of formic acid, 60 parts of acetonitrile, 21.6 parts of water and 2.9 parts of phosphoric acid. The mixture is heated for fifteen hours at 74° C. The reaction mixture is then neutralized and evaporated to dryness. Cyanoformamide is extracted from the residue with ether to obtain a 68% yield of a water soluble crystalline residue melting at 53° C.–58° C. No oxamide is found.

*Example 3*

Into a glass pressure vessel is added 21.6 parts of water, 60 parts of acetonitrile and 4.7 parts of benzenephosphonic acid. The mixture is cooled under vacuum to a temperature of about minus 75° C. To the mixture is added 16 parts of cyanogen gas. After all the latter gas is introduced, the vessel is crown-capped and heated to a temperature from 74° C.–76° C. for fifteen hours. Heating is terminated, the vessel opened, and the reaction contents in the vessel neutralized with sodium formate. Resultant mixture is evaporated to dryness and a solid residue containing cyanoformamide is obtained. The residue is extracted with ether to recover cyanoformamide in 47% yield. No detectable amount of oxamide is found.

*Example 4*

Cyanoformamide is a useful solvent for polyacrylonitrile. This example serves to illustrate this utility.

Into about 450 parts of molten cyanoformamide is added 50 parts of polyacrylonitrile crumb in the form of a gelatinous mass. The mixture is stirred until a viscous solution results. The solution solidifies upon cooling. A clear solution of dissolved polyacrylonitrile is again obtained upon reheating the mass. Resultant clear solution is extruded through a spinneret maintained at a temperature of approximately 75° C. into a coagulating bath of water maintained at a temperature of approximately 70° C. A filament or thread of polymeric acrylonitrile is formed. Films are produced when the hot solution is poured onto a warm surface, such as glass, and permitted to cool.

I claim:

1. A method for the preparation of cyanoformamide which comprises: bringing together in reactive combination a mixture of cyanogen and water in at least equivalent amounts and an acidic, water-soluble oxygenated phosphorus compound containing from about 0.01 to about 0.5 equivalent of said oxygenated compound per equivalent of cyanogen; heating the mixture at a temperature of between about 50° C. and about 90° C.; and recovering cyanoformamide from the resultant reaction mixture.

2. A method according to claim 1 in which at least two equivalents of water for each equivalent of cyanogen is present.

3. A method according to claim 1 in which the phosphorus compound is phosphoric acid.

4. A method according to claim 1 in which the phosphorus compound is benzenephosphonic acid.

5. A method according to claim 1 in which the phosphorus compound is diethylphosphoric acid.

6. A method according to claim 1 in which an inert liquid polar solvent is provided.

7. A process according to claim 6 in which the inert solvent is acetonitrile.

8. A process according to claim 6 in which the solvent is formic acid.

9. A process according to claim 6 in which the solvent is tetrahydrofuran.

References Cited in the file of this patent

Beketow: Beilstein's Handbuch (4th Edition), vol. 2, p. 549 (1920).